July 5, 1927.

R. B. FULLER 1,634,900

MOLD FOR BUILDING BLOCKS AND PROCESS OF MOLDING

Filed Dec. 31, 1924   3 Sheets-Sheet 1

Inventor,
 Richard B. Fuller,
By Samuel Balch
 Attorney.

July 5, 1927.
R. B. FULLER
1,634,900
MOLD FOR BUILDING BLOCKS AND PROCESS OF MOLDING
Filed Dec. 31, 1924   3 Sheets-Sheet 2
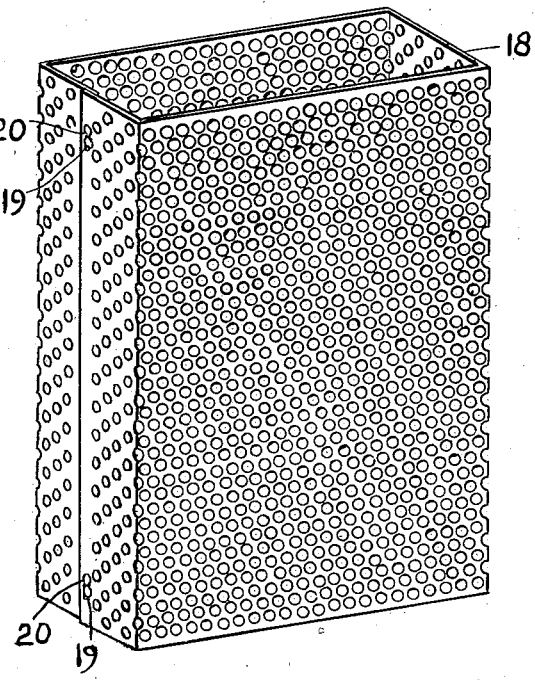
Fig. 2.
Fig. 3.
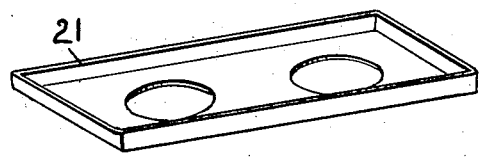
Inventor,
Richard B. Fuller,
By Samuel W. Balch
Attorney.

July 5, 1927.  
R. B. FULLER  
1,634,900  
MOLD FOR BUILDING BLOCKS AND PROCESS OF MOLDING  
Filed Dec. 31, 1924  3 Sheets-Sheet 3

Inventor,  
Richard B. Fuller,  
By *Samuel W. Balch*  
Attorney.

Patented July 5, 1927.

1,634,900

UNITED STATES PATENT OFFICE.

RICHARD B. FULLER, OF LAWRENCE, NEW YORK, ASSIGNOR TO STOCKADE BUILDING SYSTEM, INC., A CORPORATION OF NEW YORK.

MOLD FOR BUILDING BLOCKS AND PROCESS OF MOLDING.

Application filed December 31, 1924. Serial No. 758,991.

The present invention relates primarily to a process and mold for making building blocks for use in wall structures such as that described in United States Patent No. 1,450,724, granted April 3, 1923, to James Monroe Hewlett. The particular type of block which is to be produced in these molds is now set forth in Hewlett application, Ser. No. 88,522, filed February 16, 1926. These blocks are made up of loosely compacted fibrous material impregnated with a binder. I have found that such blocks can be efficiently made and given a proper degree of compactness if the prepared fibre is carried by an air blast into a mold so constructed that the air current will give the fibres a light but relatively uniform pressure. For the manufacture of the blocks referred to a particularly suitable fibrous material is shredded wood fiber, known as excelsior, but other fibrous material, as straw may be used, the main consideration being that it is obtainable at a low cost. A suitable binder is a mixture of magnesium oxide and magnesium chlorid, another is slaked lime, the qualities of which are improved by the addition of sugar.

In the accompanying three sheets of drawings which form a part of this description, Figure 1 is a general view showing the several instrumentalities involved in the means and method embodying this invention.

Fig. 2 is a perspective of the body of the mold.

Fig. 3 is a perspective of the bottom plate of the mold.

Figure 1:
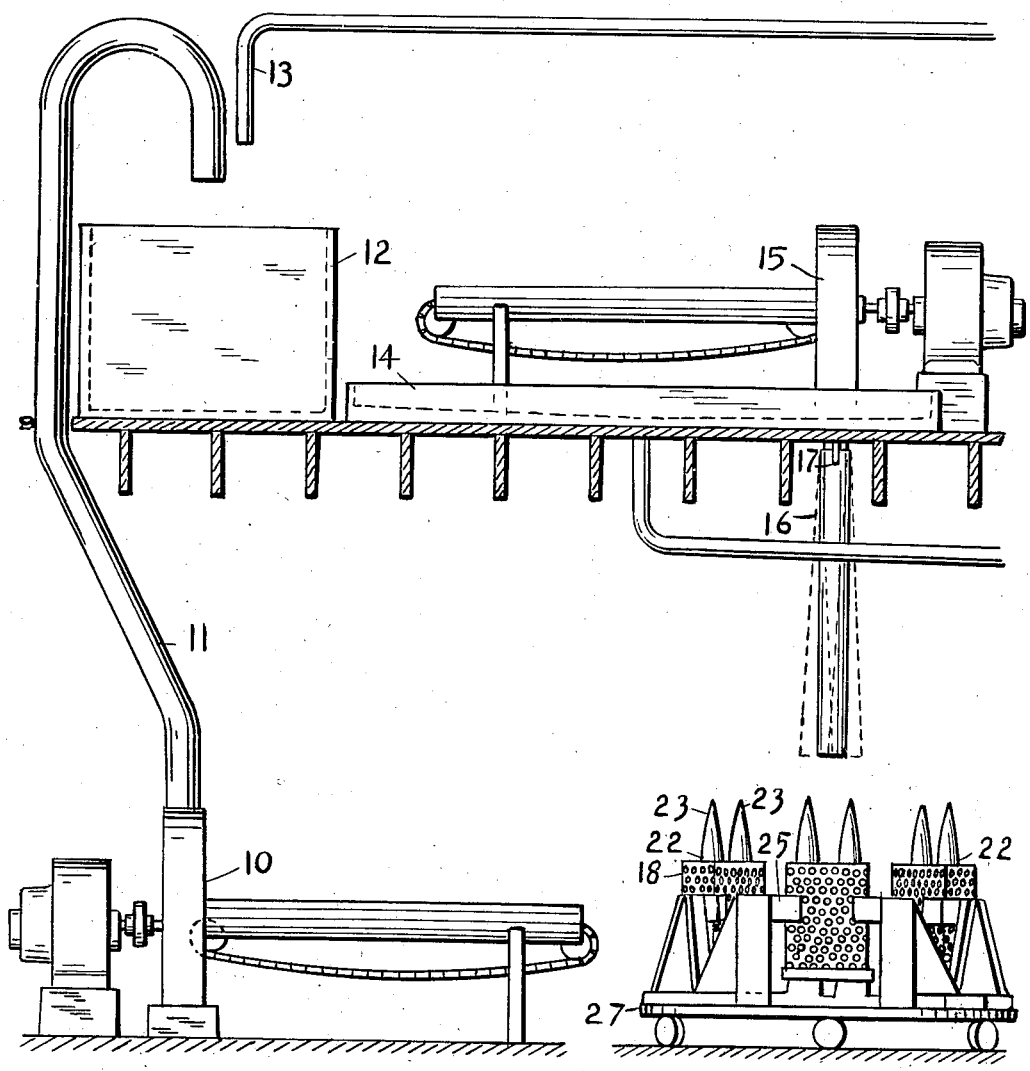
Figure 4:
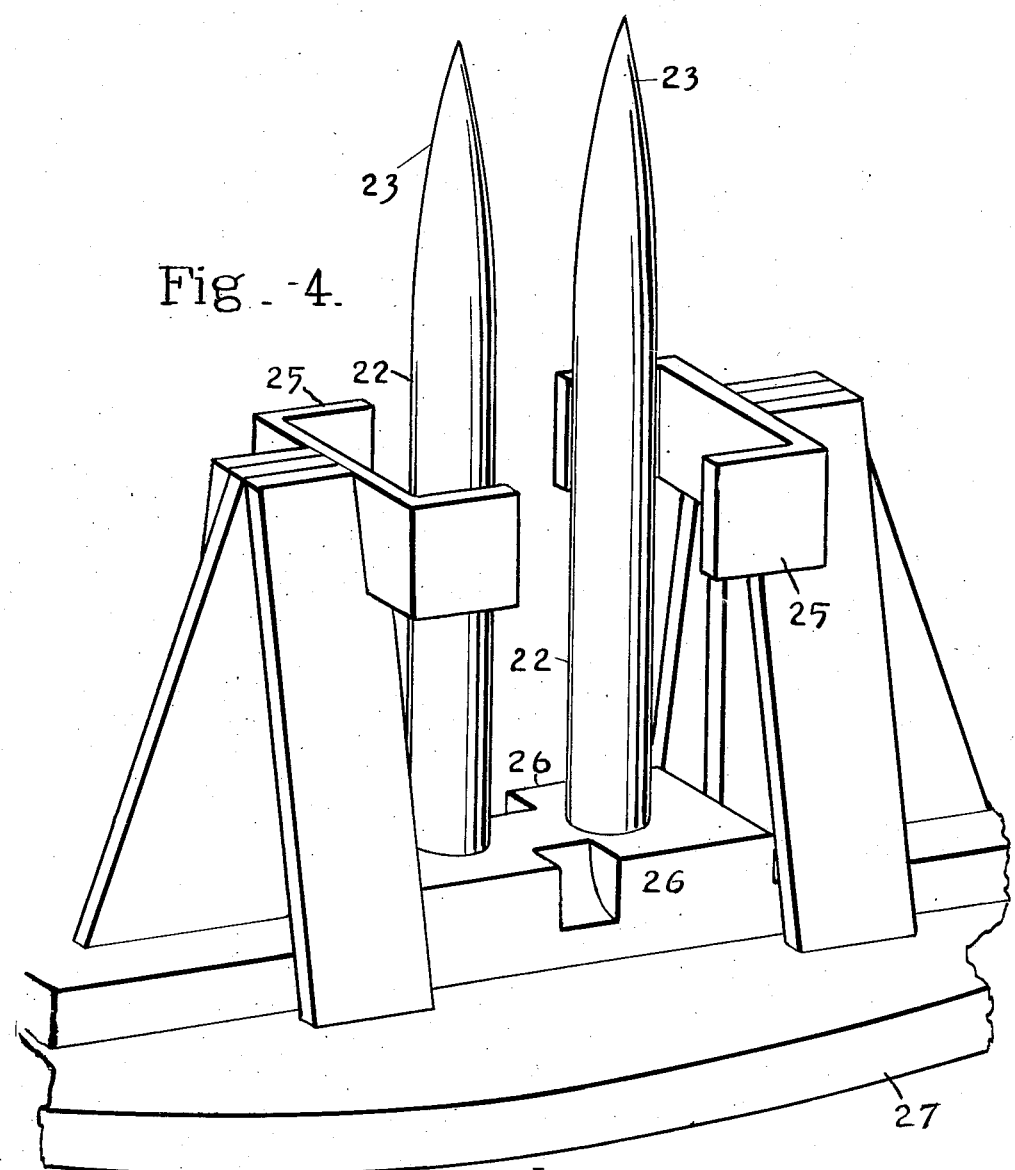
Fig. 4 is a perspective of the support for the cores and mold.

Excelsior is obtainable in compact bales. These are broken up by hand and the material is fed to an ensilage cutter 10, which may be of standard design such as is used by farmers in cutting up fodder and delivering it into silos. The ensilage cutter comprises a feed belt, a revolving cutter for cutting the fibers into short lengths and a fan blower. The excelsior is here handled dry, and this ensilage cutter is preferably located where the excelsior is received, which is preferably in a building separate from the others of the plant to reduce the fire hazard to the others.

From this ensilage cutter, the broken up excelsior is blown through a conduit 11 the mouth of which is over a bin 12. A sufficient amount of binder in solution is delivered onto the excelsior from a pipe 13, and the excelsior is forked over to insure thorough distribution, or the binder in solution may be put in first and the excelsior projected into it by the air blast with such force that it is completely submerged and thoroughly moistened. In this case it is forked out onto a tray 14 where the surplus solution is permitted to drain off. While sufficient of the binder is still adhering to the fiber it is fed through a second ensilage cutter 15 by which it is again broken up and delivered with a powerful blast of air downward through a vertical pipe 16. The pipe is pivoted at 17 so that the lower end can be swung sligthly. This pipe is without bends, except for the very slight bend in swinging the lower end since the material is now in such a condition that it would tend to lodge at bends and clog the passageway. An open mold with a body portion 18 is located under the end of the pipe, and the pipe can be swung sufficiently to discharge into all parts of this mold. The body portion is formed of sheet iron of one-sixteenth of an inch gauge and is perforated with one-half inch holes which are sufficiently close together to remove about fifty percent of the sheet. The ends of the sheet are overlapped and held together by buttons, 19, 19 which are carried by one of the ends and pass through eyes 20, 20 in the other end. The eyes are in the form of slots, each enlarged at one end so that by sliding the meeting edges endwise the buttons can be brought to the enlarged ends of the eyes and passed through to connect or disconnect the ends. A bottom plate 21 completes the exterior of the mold. This has flanges to engage the outside of the lower edges of the body portion and hold the body portion in shape. The bottom plate has two large circular holes through which pass upstanding cores 22, 22. These cores extend upward through the mold and terminate in streamline points 23, 23 above the mold. Suitable dimensions for the manufacture of building blocks are eight by sixteen inches in cross section and twenty-two inches in height. The molds are dipped in oil before use to prevent rust and the adhesion of the molded material.

A suitable support 24 rigidly carries the cores and has means in the form of guides 25, 25 to hold the upper end of the mold evenly spaced from the cores. The guides are not of sufficient extent to materially obstruct the perforations in the mold body. Proper positioning with respect to the cores at the lower end of the mold is insured by the bottom plate. Notches 26, 26 in the base of the support are provided so that hooks from a crane can engage under the mold to lift it off when filled. The supports are mounted on a turn-table 27 so that the molds can be quickly brought into place for filling.

When filling the mold, an attendant swings the delivery pipe so as to be sure that the material will be evenly distributed. Ordinarily, no tamping will be necessary; the material has already been broken up in such a way that there will be no solid masses, and the air blast will pass through the upper portion of the material which is already in place and escape through the perforations in the sides of the mold, thereby compacting the fibres just enough so that they will stick together. The air current may also serve to dry the binder a little so that the fibres will remain in the position which they assume under the influence of the pressure of the flowing air stream.

In this connection it may be noted that owing to the stream-line shape of the cores 22, the air current will not be deflected from the sides of these cores, but the material directly adjacent the sides of the cores will be subjected to the action of the air stream and properly compacted. Of course if a mold is, in part, filled improperly, a small amount of tamping or manual arrangement of the material may be necessary. After the molds are filled, they are removed and the contents dried in any desired way as in a kiln. After the contents has dried, the molds are unhooked, opened and removed from the molded blocks, and each block from the mold is sawed apart to form five blocks, each four inches in height and eight by sixteen inches in horizontal dimensions.

I claim,—

1. An open-top mold with perforated walls in combination with a core extending upward through the mold and terminating in a streamline point above the top of the mold, and means for blowing material into the mold.

2. An open-top mold with perforated walls in combination with a core extending upward through the mold and terminating in a streamline point above the top of the mold, means for breaking up the mass of the material prior to its introduction into the mold, and means for blowing the material into the mold.

3. The method of making fibrous building blocks, which comprises the steps of coating fibrous material with a binder, draining off excess binder, agitating the material to break up impermeable masses, charging the material by an air blast into a perforated mold, and permitting air to escape from the sides of the mold below the top level of the material therein, whereby the fibrous particles of the material are compressed together sufficiently to adhere to each other, but are not compressed to the point where a substantially solid block is formed.

RICHARD B. FULLER.